(12) United States Patent
Saboor et al.

(10) Patent No.: US 10,116,138 B2
(45) Date of Patent: Oct. 30, 2018

(54) WIND POWER PLANT, AND A METHOD FOR CONTROLLING A REACTIVE CURRENT INJECTION IN A WIND POWER PLANT

(71) Applicant: VESTAS WIND SYSTEMS A/S, Aarhus N (DK)

(72) Inventors: Abdul Saboor, Singapore (SG); Manoj Gupta, Singapore (SG)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 142 days.

(21) Appl. No.: 15/103,725

(22) PCT Filed: Nov. 25, 2014

(86) PCT No.: PCT/DK2014/050401
§ 371 (c)(1),
(2) Date: Jun. 10, 2016

(87) PCT Pub. No.: WO2015/086022
PCT Pub. Date: Jun. 18, 2015

(65) Prior Publication Data
US 2016/0322821 A1    Nov. 3, 2016

(30) Foreign Application Priority Data

Dec. 11, 2013 (DK) .................. 2013 70761

(51) Int. Cl.
*H02J 3/16* (2006.01)
*H02J 3/38* (2006.01)
(Continued)

(52) U.S. Cl.
CPC .............. *H02J 3/16* (2013.01); *F03D 7/0284* (2013.01); *F03D 7/048* (2013.01); *H02J 3/381* (2013.01);
(Continued)

(58) Field of Classification Search
None
See application file for complete search history.

(56) References Cited

U.S. PATENT DOCUMENTS

2005/0046196 A1    3/2005  Larsen
2007/0273155 A1*   11/2007 Barton ............... H02J 3/1892
                                              290/44
(Continued)

FOREIGN PATENT DOCUMENTS

AU    2009342166 A1    11/2010
CN      103414204 A    11/2013
(Continued)

OTHER PUBLICATIONS

International Search Report for PCT/DK2014/050401, dated May 20, 2015.
(Continued)

*Primary Examiner* — Jared Fureman
*Assistant Examiner* — Aqeel Bukhari
(74) *Attorney, Agent, or Firm* — Patterson + Sheridan, LLP

(57) ABSTRACT

In various embodiments of the present disclosure, there is provided a method for controlling a reactive current injection in a wind power plant during a grid fault. According to an embodiment, the method includes measuring an amount of reactive current to be provided by the wind power plant to the grid during the grid fault. The method further includes determining a difference between a given required reactive current contribution from the wind power plant and the amount of reactive current to be provided by the wind power plant to the grid during the grid fault. According to an embodiment, the method includes controlling a plurality of wind turbine generators in the wind power plant to generate additional reactive current according to a reactive current
(Continued)

reference generated based on the difference. A corresponding wind power plant is further provided.

17 Claims, 6 Drawing Sheets

(51) Int. Cl.
*F03D 7/04* (2006.01)
*F03D 7/02* (2006.01)
*H02J 3/50* (2006.01)

(52) U.S. Cl.
CPC ............... *H02J 3/386* (2013.01); *H02J 3/50* (2013.01); *F05B 2270/337* (2013.01); *Y02E 10/723* (2013.01); *Y02E 10/763* (2013.01); *Y02E 40/34* (2013.01)

(56) References Cited

U.S. PATENT DOCUMENTS

| | | |
|---|---|---|
| 2008/0150383 A1 | 6/2008 | Groening |
| 2009/0160187 A1 | 6/2009 | Scholte-Wassink |
| 2010/0025994 A1 | 2/2010 | Cardinal et al. |
| 2010/0109328 A1 | 5/2010 | Li et al. |
| 2010/0332040 A1* | 12/2010 | Garcia ................. F03D 7/0284 700/287 |
| 2011/0178646 A1 | 7/2011 | Haj-Maharsi et al. |
| 2012/0101643 A1 | 4/2012 | Kirchner et al. |
| 2012/0248772 A1* | 10/2012 | Shigemizu ................ H02P 9/04 290/44 |
| 2014/0062086 A1* | 3/2014 | Mata Dumenjo ..... H02J 3/1842 290/44 |

FOREIGN PATENT DOCUMENTS

| | | |
|---|---|---|
| EP | 2608350 A2 | 6/2013 |
| EP | 2658112 A2 | 10/2013 |
| WO | 2012/016585 A1 | 2/2012 |
| WO | 2013/044922 A1 | 4/2013 |
| WO | 2013/097862 A2 | 7/2013 |

OTHER PUBLICATIONS

Danish Search Report for PA 2013 70761, dated Jul. 28, 2014.
Torchyan, K., et al.: "Adaptive secondary voltage control for grid interface of large scale wind park", 2013 IEEE Grenoble Conference, IEEE, Jun. 16, 2013, pp. 1-6.

* cited by examiner

WIND POWER PLANT, AND A METHOD FOR CONTROLLING A REACTIVE CURRENT INJECTION IN A WIND POWER PLANT

TECHNICAL FIELD

The present disclosure describes embodiments generally relating to a wind power plant, and to a method for controlling a reactive current injection in a wind power plant.

BACKGROUND

The development and acceptance of wind energy as a clean and productive source of alternative energy is proliferating. Wind energy can be captured by a wind turbine generator, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together to form a wind park or wind power plant.

The significant growth in acceptance of wind power generation has led to various countries and electrical grid operators implementing stringent grid connection requirements, also known as grid codes. Some grid codes, for example certain grid codes in Germany, Spain, South Africa, Jordan, Philippines and other countries, require wind turbine generators in the wind power plant to remain connected, as well as for the wind power plant to produce a controlled reactive current injection at the point of common connection (PCC) according to an injection profile based on the voltage dip during the grid fault.

The reactive current injection is required of the wind power plant to prevent the loss of power generation during the abnormal grid fault condition, as well as to improve an overall voltage profile of the wind power plant.

Generally, installed wind turbine generators are capable of generating reactive current in order to comply with a reactive current injection requirement during a grid fault. However, even though wind turbine generators are able to provide reactive current in accordance to a corresponding injection profile, a wind power plant may still not be able to meet the controlled reactive current injection requirement. This is because a significant portion of the generated and injected reactive current from the wind turbine generators of the wind power plant is consumed as inductive reactance of the wind turbine generator, wind power plant substation transformers, or other equipment in the wind power plant. As a result, the total reactive current injection from the wind power plant at the PCC is resultantly less than the required injection amount.

Further, there is a continual enhancement of grid code requirements, some of which demand even more reactive current injection, in the event of shallow voltage dips by the grid. This leads to situations where a wind power plant may not be able to meet grid code requirements in view of losses caused by equipment internal to the plant.

SUMMARY

There is as such a desire for a method for controlling a reactive current injection in a wind power plant which can continue adequately support the grid through a grid fault occurrence by complying with reactive current injection requirements at the point of common coupling.

According to various embodiments, there is provided a method for controlling a reactive current injection in a wind power plant during a grid fault, including measuring an amount of reactive current to be provided by the wind power plant to the grid during the grid fault; determining a difference between a given required reactive current contribution from the wind power plant and the amount of reactive current to be provided by the wind power plant to the grid during the grid fault; and controlling a plurality of wind turbine generators in the wind power plant to generate additional reactive current according to a reactive current reference generated based on the difference.

According to various embodiments, there is provided a wind power plant, including: a plurality of wind turbine generators; and a power plant controller including: a measurement module configured to measure an amount of reactive current to be provided by the wind power plant to the grid during the grid fault; a differential module configured to determine a difference between a given required reactive current contribution from the wind power plant and the amount of reactive current to be provided by the wind power plant to the grid during the grid fault; and a reactive current controller configured to generate a reactive current reference based on the difference to control the plurality of wind turbine generators to generate additional reactive current.

BRIEF DESCRIPTION OF THE DRAWINGS

In the drawings, like reference characters generally refer to the same parts throughout the different views. The drawings are not necessarily to scale, with emphasis instead generally being placed upon illustrating the principles of the present disclosure. It is to be noted that the accompanying drawings illustrate only examples of embodiments of this disclosure and are therefore not to be considered limiting of its scope, for the disclosure may admit to other equally effective embodiments. In the following description, various embodiments of the disclosure are described with reference to the following drawings, in which.

DETAILED DESCRIPTION

Figure 1:
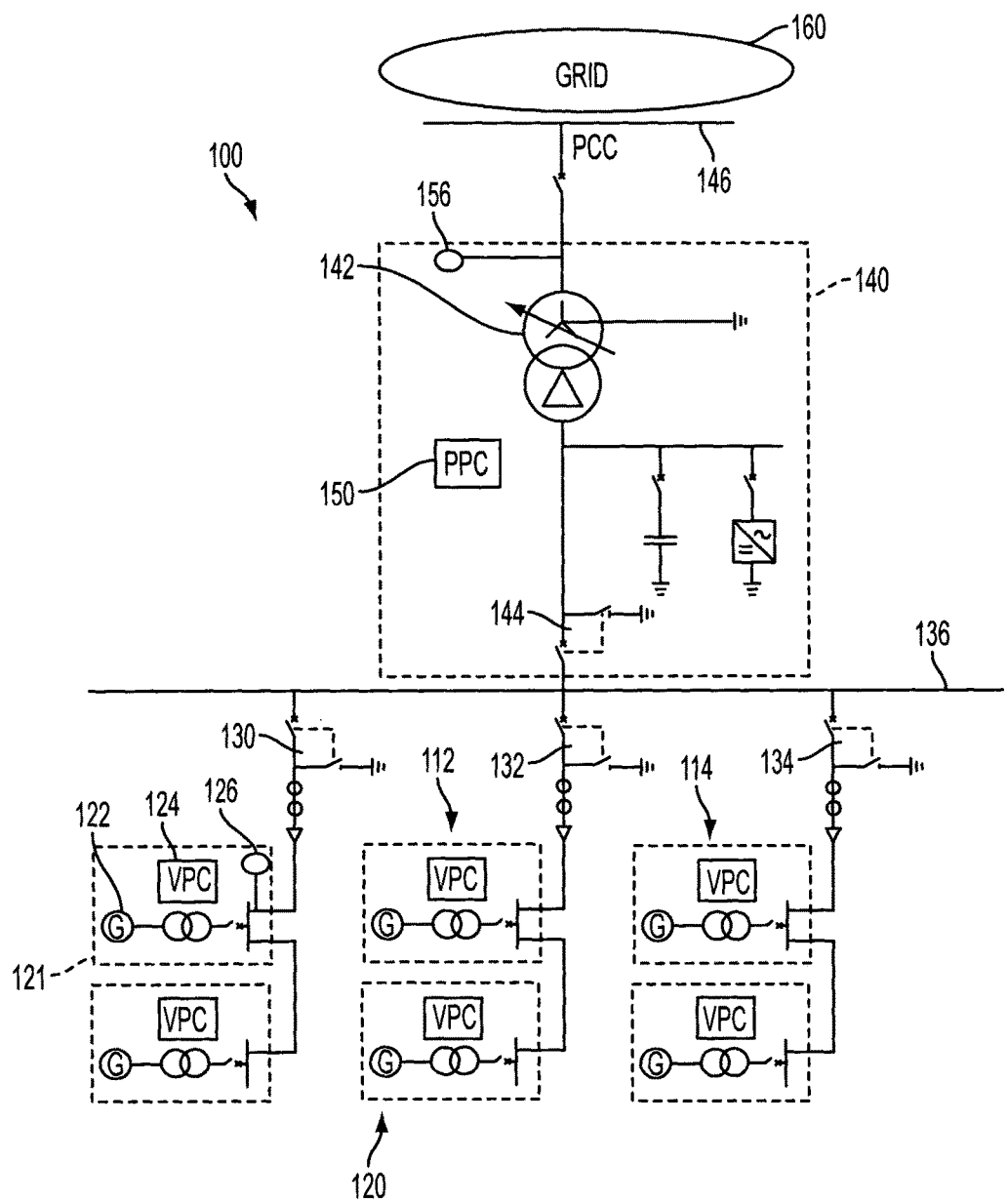
FIG. 1 illustrates a wind power plant according to an embodiment.

Embodiments of a method for controlling a reactive current injection in a wind power plant and a wind power plant are described in detail below with reference to the accompanying figures. However, it should be understood that the disclosure is not limited to specific described embodiments. It will be appreciated that the embodiments described below can be modified in various aspects, features, and elements, without changing the essence of the disclosure. Further, any reference to various embodiments shall not be construed as a generalization of any inventive subject matter disclosed herein and shall not be considered to be an element or limitation of the appended claims except where explicitly recited in a claim(s).

According to various embodiments, depiction of a given element or consideration or use of a particular element number in a particular FIG. or a reference thereto in corresponding descriptive material can encompass the same, an equivalent, or an analogous element or element number identified in another FIG. or descriptive material associated therewith. The use of "/" herein means "and/or" unless specifically indicated otherwise.

The present disclosure can describe embodiments of a consumer electronic device which can be operable in various orientations, and it thus should be understood that any of the terms "top", "bottom", "base", "down", "sideways", "downwards" etc., when used in the following description are used for convenience and to aid understanding of relative positions or directions, and not intended to limit the orientation of the recording medium or a system or apparatus or product incorporating the recording medium.

A computing system or a controller or a microcontroller or any other system providing a processing capability can be presented according to various embodiments in the present disclosure. Such a system can be taken to include a processor. A wind power plant and a wind turbine generator operating in the wind power plant according to various embodiments can include a controller which may include a memory which is for example used in the processing carried out by the wind power plant controller and/or the wind turbine controller. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In various embodiments, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with various alternative embodiments. Similarly, a "module" is thusly defined as a portion of a system according to various embodiments in the present disclosure and may encompass a "circuit" as above, or may be understood to be any kind of a logic-implementing entity therefrom.

FIG. 1 illustrates a wind power plant according to an embodiment. In an embodiment, wind turbine plant or a wind power plant 100, is provided. A wind power plant is typically formed as a collection of wind generation units, or wind turbine generators, such that control is centralized and a single coupling is made to an electrical transmission grid, or an electrical grid, or a electrical grid, or a power grid 160. In various embodiments, the wind power plant 100 can be connectable to an electrical grid 160.

In an embodiment, wind power plant 100 includes a plurality of transmission branches 110, 112, 114, each including a plurality of wind turbine generators, or wind turbines, 120 electrically connected to a corresponding transmission branch. In an embodiment, the wind power plant 100 includes a fleet of similar wind turbine generators 120. Wind turbine generator 121 is used as a reference in the present disclosure for a description which can apply to the plurality if wind turbine generators 120. In other embodiments, it is possible to have a variety of wind turbine generators connected to the transmission branches in the wind power plant. This is as wind turbine generators are typically geographically distributed at various locations where prevailing winds would be better utilized by different types of wind turbine generators. In an embodiment, there are two wind turbines connected to transmission branches 110, 112, 114. However, there are typically no guidelines as to the number of wind turbines per transmission branch, simply by preference of physical location.

Each transmission branch 110, 112, 114 is coupled to a plant distribution busbar 136, which may also be known as a main busbar, by a transmission branch circuit breaker 130, 132, 134. The function of the transmission branch circuit breaker is to protect both the wind turbines connected to the transmission branch and the other portions of the wind power plant from power surges or spikes which might take place when there is a fault in the electrical grid or in the plant. In such an instance, the circuit breaker trips into an open circuit condition, and isolates the transmission branch from the wind power plant, until the fault is identified and addressed, and the electrical system is back in order for the reconnection of the transmission branch.

The plant substation 140 includes the plant distribution busbar 136. Plant substations can either be a physical area of the wind power plant or an aggregated number of features spread over the plant. In an embodiment, the substation 140 is presented as being located in one physical area. According to the embodiment, the main components of the substation 140 are the main transformer 142, which steps up generated power in the plant to an appropriate voltage to be provided to an electrical grid 160, and the main switchgear 144, which defines an active switch for the wind power plant. The plant substation 140 sits in between the transmission branches 130, 132, 134 of the wind power plant 100 and the point of common coupling 146 to the electrical grid 160.

According to an embodiment, some power compensation equipment 148 is located together with the plant substation 140. In an embodiment, the power compensation equipment 148 includes a number of static synchronous compensators (STATCOMs), but other alternatives could also be possible, such as: switched capacitor banks, switched inductor banks, static condensers, and synchronous condensers. The power compensation equipment 148 is used to control the power factor, the level of reactive power contributed, or the voltage level of the point of common coupling 146. In other embodiments, the power compensation equipment could be distributed to and located at each wind turbine generator 120.

Operation of the wind power plant 100 is controlled by a power plant controller ("PPC") 150 that dispatches various reference set points to individual wind turbine generators 120 in the wind power plant 100. The power plant controller 150 also receives multiple sources of measurements or output readings from each wind turbine generator 120, as well as from various locations on the transmission branches 110, 112, 114, the distribution line 136, the plant substation 140, and the electrical grid 160, and uses the information received to optimize the wind power plant fault current contribution to the electrical grid. The power plant controller 150 can also receive set points for operation from the grid operator of the electrical grid 160 the wind power plant 100 is coupled to.

According to an embodiment, the PPC 150 of the wind power plant 100 is part of a supervisory control and data acquisition (SCADA) network coupling the plant 100 and the plurality of wind turbine generators 120 in the plant 100 to a remote data and control center. The plant SCADA network can include data transmission coupling between plant and turbine controllers provided by a laid fiber optic transmission.

In an embodiment, a sensor 152 is provided at the point of common coupling 146, and the resultant output is provided to the PPC 150 for monitoring of electrical characteristics of the electrical grid 160. A voltage, current and power characteristic can be monitored, and post-processed to various useful characteristic formats by the PPC 150.

Wind turbine generator 121 can include a plurality of rotor blades driving a rotating main shaft which is mechanically coupled to a gearbox which steps up the rotation for a high-speed generator shaft of a power production system 122. In an embodiment, the power production system 122 includes a doubly fed induction generator (DFIG in which the generator shaft is coupled to the generator rotor or Type3). In an embodiment, the generator is a Full Converter Generator (Type 4) generator. The Type4 generator is coupled to a full scale power converter. The method as described in embodiments of the present disclosure is applicable to both Type3 and Type4 machine. In the doubly fed induction generator, mechanical torque is converted into electrical power, which is thereafter provided to a frequency converter for power conditioning. The output of the frequency converter is stepped up with a transformer provided in the turbine, which subsequently produces electrical power rated at 30 kV (it can be any voltage rating from 10 kV to 35 kV) to the transmission branch 110. In various embodiments, the transformer can step the electrical power up to a voltage rating of from 10 kV to 35 kV.

In other embodiments, the turbines in the plant can include a power production system including a generator which can be a singly-fed synchronous generator, an induction generator, a permanent magnet generator or any other type of generator including a stator winding. Further, turbines in other embodiments can include a power production system including direct drive or other alternative drive systems, which eliminate the use of a traditional gearbox. Any wind turbine power production system electrical configuration can be possible in satisfying the purpose of electrical power generation from kinetic wind capture.

According to an embodiment, in normal operation, wind turbine generator 121 receives a power reference from the PPC 150 such that a controlled output of electrical power is generated. The power references generated by the PPC 150 depends on the grid operating condition as experienced by the grid 160 operator, as well as the presently experienced wind for energy conversion. In an embodiment, the power reference from the PPC 150 can be provided as an active power reference P* and a reactive power reference Q*, indicating to the wind turbine generator 121 as the required amount of power to be generated and supplied by the wind turbine generator 121 as part of the wind power plant's contribution to the electrical grid 160. In an embodiment, the power reference from the PPC 150 can also be a power factor reference, which can be defined as the ratio of the real power to the load, to the apparent power in the circuit.

In an embodiment, wind turbine generator 121 includes a wind turbine controller (not shown). The wind turbine controller includes control capabilities for controlling various aspects of wind turbine functionality, for example, wind capture optimization in nacelle yaw and blade pitch capabilities, emergency procedures such as emergency brake or turbine shutdown, or electrical production control. In various embodiments, the wind turbine controller is configured to maximize power production, whilst preventing damage to the wind turbine or to the load.

In an embodiment, the wind turbine controller can include a wind turbine power controller 124. The wind turbine power controller 124 can be provided with processing power, such as with computers, microprocessors, microcontrollers, digital signal processing (DSP) boards, Application Specific Integrated Circuits (ASICs) or any others, and with accompanying appropriate memory modules or any non-transitory computer-readable storage medium.

The wind turbine power controller 124 is provided for the supervision of the power production capability of the wind turbine generator 121. In various embodiments, the wind turbine power controller 124 is coupled to the PPC 150 and receives from the PPC an active power reference P* and a reactive power reference Q* for a provision requirement of the wind turbine generator 121 to the plant 100. Further, the wind turbine power controller 124 is coupled to and is constant communication with the wind turbine controller. In various embodiments, information regarding the control of the wind turbine generator 121 is provided to the wind turbine controller for executing, and sensor information is provided to the wind turbine power controller 124 for use in optimizing power generation by the wind turbine generator 120. Under normal operating conditions the turbine will follow the P* and Q* reference from the PPC.

In an embodiment, the wind turbine power controller 124 is coupled to a voltage sensor 126 configured to take an electrical voltage measurement at the point of coupling of the wind turbine generator 121 to the wind power plant 100. In an embodiment, the voltage sensor is configured to take an electrical voltage measurement at the point of coupling of the wind turbine generator 121 to transmission line 110 as part of the wind power plant 100. The wind turbine power controller 124 receives an output of the voltage sensor 126, which reflects a voltage of the transmission line 110 of the wind power plant 100, which is also a representation of the grid voltage of the electrical grid 160 as coupled with the wind power plant 100.

Each of the wind turbine generators 120 in the wind power plant 100 similarly includes a voltage sensor input, the voltage sensor configured to take an electrical voltage measurement at the point of coupling of each of the plurality of wind turbine generators 120 to a transmission line of the wind power plant. Each voltage sensor would provide an individual reading to a wind turbine power controller provided in each of the plurality of wind turbine generators 120 in the wind power plant. Although a reflection of the grid voltage as coupled to the electrical grid 160, each voltage sensor would provide a slightly different reading in view of the different physical electrical characteristics, such as impedance, capacitance and inductance of each measuring location to the point of common coupling 146.

According to an embodiment, the voltage sensor 126 of the wind turbine 121 is used to obtain a voltage reading of the electrical grid undergoing a grid fault event, either a low voltage event where the grid voltage drops between a predetermined threshold, or a high voltage even, where the grid voltage rises above a predetermined threshold.

In an embodiment, a voltage sensor is provided on each of the transmission lines 110, 112, 114 of the wind power plant. Such a voltage sensor registers and monitors electrical voltage characteristics of the wind power plant at each transmission line and provides an output reading to each of the wind turbine generators coupled to the transmission line. Such an arrangement might be suitable for when the transmission line includes wind turbine generators relatively close to one another, thereby allowing for a minimal lag time in data transmission, as well as only slight deviation in physical electrical transmission variation.

Figure 2:
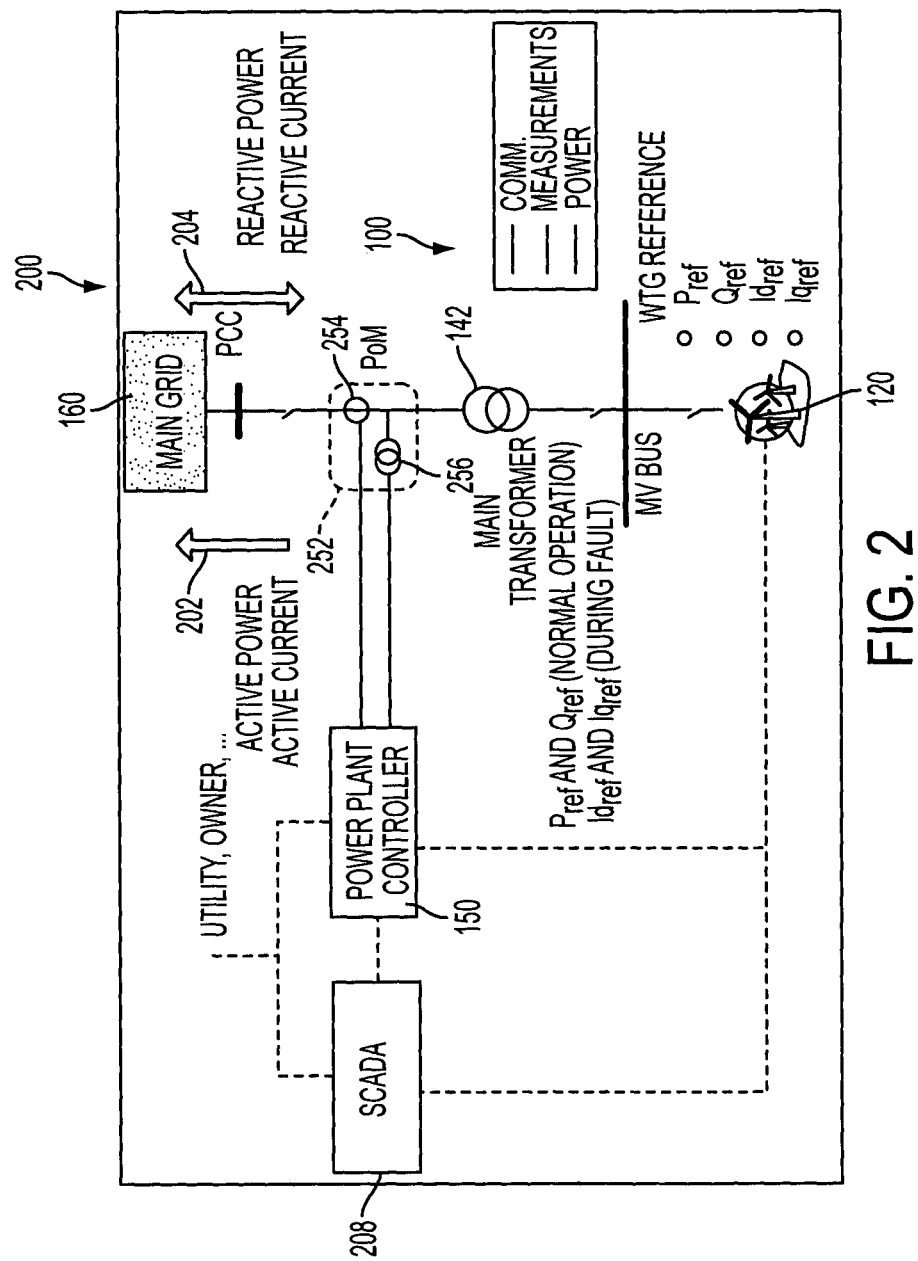
FIG. 2 illustrates a schematic overview of a wind power plant in operation according to an embodiment.

FIG. 2 illustrates a schematic overview of a wind power plant in operation according to an embodiment. Schematic 200 provides an overview of a wind power plant 100 operation. Wind power plant 100 is shown to be coupled to a main grid or an electrical grid 160 at a point of common coupling (PCC) 146. The wind power plant 100 includes a plurality of wind turbine generators 120 coupled to a medium voltage transmission bus 136 which is thereafter coupled to a high voltage main transformer 142 which further steps up the voltage of the electrical power generated by the wind turbine generators 120 to an appropriate voltage to be provided to the electrical grid 160.

With regard to electrical power communication, active power and/or active current is shown provided by the wind power plant 100 to the electrical grid 160 by directional arrow 202. As understood, the wind power plant 100 is a power generation capability and is intended to provide a flow of active power to the electrical grid 160 for transmission and distribution for customer consumption. However, reactive power and/or reactive current is shown to be flow bi-directionally to and from the electrical grid 160 by arrow 204.

Certain generalized examples of reactive power and/or reactive current flow can be during a low voltage grid event, where a wind power plant is required to provide a reactive current injection as support for grid voltage recovery, or during a high voltage grid fluctuation, where the wind power plant absorbs reactive power as support for grid voltage recovery.

In tracking the provision of electrical power from the wind power plant 100 to the electrical grid 160, an array of sensors 252 is provided at a Point of Measurement (PoM) which is located slightly downstream from the point of common coupling 146. In embodiments, the PoM can coincide with the point of common coupling. In an embodiment, a voltage sensor 254 and a reactive current sensor 256 are provided in the array of sensors 252 in the PoM. In an embodiment, a dedicated measurement line can be provided for the coupling of the array of sensors 252 with the PPC 150, such that measurements can be transmitted and received over a dedicated communication line.

In other embodiments, various additional sensors can be provided at the PoM to provide a mode detailed overview of the electrical generation by the wind power plant 100. A centralized power plant controller (PPC) 150 is provided and receives inputs from the PoM sensors 252 and carries out the wind power plant control loops, for example, voltage, frequency, power factor control, power limits, and various other plant control factors.

In an embodiment, the PPC 150 receives inputs and operational targets from utility operators or transmission grid operators or owners, and based on the inputs carries out processing to cause the wind power plant 100 to supply or respond as requested by the inputs and/or operational targets. In an embodiment, the PPC 150 receives targets set by the grid operator and thereafter generates active and reactive power control references based on such targets. According to an embodiment, the PPC 150 generates and distributes or dispatches active and reactive power references P* and Q* (or $P_{ref}$ and $Q_{ref}$) to wind turbine generators 120 in the plant 100, as according to incoming inputs or targets from an electrical grid operator. It is noted that the PPC only generates power references P* and Q* during normal operation, i.e. when the grid voltage is within a certain band according to the connecting electrical grid code, and the wind turbine plant 100 is generally able to provide active power to the electrical grid. In an embodiment, an operating band as determined by a grid code can be 1.0 p.u.±15%. In other embodiments, the range can be any band of productive advantage for the utility operator.

It can be noted that communication within the wind power plant 100 can be carried over the SCADA network. Further, communication between the wind power plant and a grid or utility operator can also take place through the SCADA network. A central SCADA controller 208 provides supervisory control on the network.

According to an embodiment, during a grid fault event, i.e. when the grid voltage deviates out of the normal operational band, the PPC 150 ceases generation of the active and reactive power references for distribution to the wind turbine generators 120, and freezes the active and reactive power references to the wind turbine generators 120. Instead, the PPC 150 generate an active current control reference $I_{dref}$ and a reactive current control reference $I_{qref}$ for distribution to the wind turbine generators 120. The active and reactive current references $I_{dref}$ and $I_{qref}$ are generated with a view for the wind power plant to comply with reactive current injection requirements during a grid fault event.

In embodiments, each of the wind turbine generators 120 in the wind power plant 100 includes a power controller 124 configured to receive the active and reactive power references and the active and reactive current references from the PPC 150, and to correspondingly control various factors in the power production system 122 of the wind turbine generator 120 in order for the wind turbine generator 120 to provide as requested by the PPC-generated reference.

According to various embodiments, the wind power plant 100 is configured to operate through a grid fault and support the recovery of the electrical grid. In the event of a grid fault, or the deviation of the grid voltage from an operating band or operating range, in an embodiment predetermined to be 1.0 p.u.±15%, the wind power plant generally seeks to carry out a fault ride through mode in which the power generating plant stays connected to the electrical grid and continues providing the electrical grid with required support.

In various embodiments, the wind power plant 100 is configured to operate through a low voltage grid event or a low voltage grid fault and to support the recovery of the electrical grid 160 from the grid fault. According to various embodiments, a low voltage event is detected when the grid voltage drops to or below 0.85 p.u. In such an even, the wind power plant 100 undertakes a fault-ride through mode, and the PPC 150 ceases the generation of active and reactive power references P* and Q* and the controls in the PPC 150 are set to a freeze mode.

Upon the wind power plant undertaking a fault ride through mode, the wind turbine generators 120 in the wind power plant 100 similarly enters a fault ride through mode. In an embodiment, a wind turbine generator enters a fault ride through mode upon receiving a transmitted indication from the PPC to enter the fault ride through mode. In an embodiment, a wind turbine generator enters a fault ride through mode upon detecting a drop in the voltage reading from a voltage sensor coupled to the wind turbine generator power controller, indicating a low voltage fault event.

Figure 3:
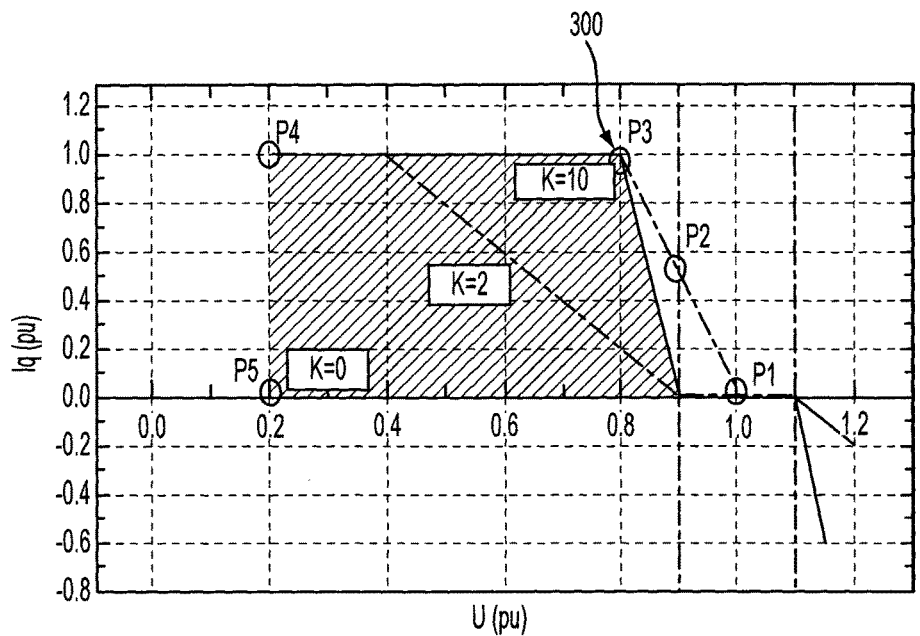
FIG. 3 illustrates a wind turbine reactive current injection curve according to an embodiment.

Upon entering a fault ride through mode, the power controller 124 of the wind turbine generator 121 configures the wind turbine power production system 122 to produce a reactive current for injection to the electrical grid 160. FIG. 3 illustrates a wind turbine reactive current injection curve 300 according to an embodiment. Curve 300 is specific to the wind turbine generator according to an embodiment, and may vary in accordance to various turbine models and types. Curve 300 illustrates the amount of reactive current injection $I_q$ (p.u.) the wind turbine generator is supposed to provide to the electrical grid 160 based on the grid voltage U (p.u.). Such an amount can be determined as a given required reactive current contribution from the wind power plant. The wind turbine generator acts as a current source and injects a definite amount of current according to the curve.

In an embodiment, the reference operating band or normal operating band for a wind turbine generator is provided as 1.0±10% p.u. or from 0.9-1.1 p.u. Should the grid voltage of the electrical grid 160 deviate from the operating band, for example, drop below 0.9 p.u., the wind turbine generator enters a fault ride through mode and the power controller 124 of the wind turbine generator 121 provides control over the power production system 122 of the wind turbine in order to generate a reactive current injection according to the curve 300.

For example, according to curve 300, if the grid voltage drops to 0.6 p.u., the wind turbine generator 121 is controlled to generate a reactive current $I_q$ of 0.6 p.u. for provision to the electrical grid. In another example, should the grid voltage drop below 0.4 p.u., the wind turbine generator is controlled to generate a reactive current $I_q$ of 1.0 p.u. for provision to the electrical grid. It is further noted that should the grid voltage rises above the range provided by the normal operating band, the wind turbine generator 121 is configured to accept or absorb a reactive current injection from the electrical grid. Such a situation occurs during a high voltage fault ride through undertaken by the wind turbine power controller.

Figure 4:
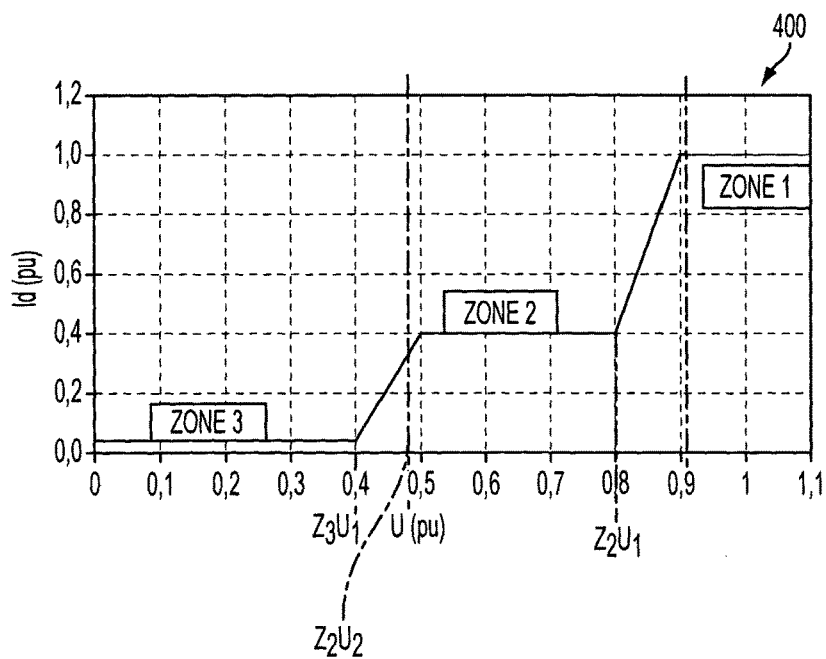
FIG. 4 illustrates a wind turbine active current injection curve according to an embodiment.

In various embodiments, when the grid voltage drops below a predetermined normal operating band, the wind turbine generators are designed or configured to reduce the generation and supply of active power or active current for provision to the electrical grid. FIG. 4 illustrates a wind turbine active current injection curve 400 according to an embodiment. Curve 400 is specific to the wind turbine generator according to an embodiment, and may vary in accordance to various turbine models and types. Curve 400 illustrates how the active current $I_p$ (p.u.) is intended to vary with respect to the grid voltage U (p.u.).

In various embodiments, curve 400 is separated into three zones for efficient operation. In other embodiments, a fully varying active current injection response can also be provided. The intention of the curve 400 by varying active current injection with respect to the electrical grid voltage is such that the wind turbine generator does not overwhelm the low voltage grid with active power when the electrical grid cannot cope with a power transmission and distribution function due to the low grid voltage environment. Further, the variance of the active current injection allows for the wind turbine generator to reduce the active current production capability to therefore allow for an increase in reactive current production capability.

According to an embodiment, when the grid voltage ranges from 0.9 p.u. to 1.1 p.u., or within a predetermined normal operation band, the wind turbine generator is allowed to generate and supply to the electrical grid 160 active current at 1.0 p.u. This grid voltage range is classified to be as Zone 1 according to an embodiment. Zone 2 is determined to be at a grid voltage range of 0.5-0.9 p.u. In this zone, the active current injection capability of the wind turbine generator is dropped to 0.4 p.u. The gradient of the curve 400 in transitioning from Zone 1 to Zone 2, i.e. from 1.0 p.u. to 0.4 p.u., determines the shape of the current injection curve, and thus also impacts the amount of current injection. In such a case, the transitional gradient of the current injection curve can be altered where necessary and according to the situation.

In an embodiment, Zone 3 is determined to be from a grid voltage of under 0.5 p.u. Should the grid voltage drop into Zone 3, the active current production capability of the wind turbine generator is fully cut, which allows for a maximum production of reactive current instead.

As mentioned above, an issue arises during the provision of reactive current by a wind power plant 100, where due to the presence and connection of various plant equipment, the reactive current as consolidated or summed at the PoM or the point of common coupling is not equivalent to the amount of reactive current required by the electrical grid. In other words, the utility grid operator provides a reactive current injection requirement based on grid voltage to the wind power plant, for which each wind turbine generator in the wind power plant stores in its wind turbine power controller for reference generation during a grid fault event.

Even though the wind turbine generators typically comply with the amount of reactive current they are required to inject, when the generated reactive current is consolidated or summed at an overall plant level, the resultant reactive current at the point of common coupling which indicates the amount of reactive current the plant is to provide to the electrical grid may not match up to the amount of reactive current the plant is supposed to inject based on the provided requirements. In embodiments of the present disclosure, generated reactive current from the wind turbine generators which is consolidated at an overall plant level for delivery to the grid can be understood to be an amount of reactive current to be provided by the wind power plant to the grid during a fault. Such a deficiency where the resultant reactive current does not equate to the required reactive current contribution could be due to internal plant equipment reactive current injection, as well as plant layout and transmission line configuration. Further, such internal reactive current consumption can vary in accordance to grid voltage.

According to an embodiment, a wind power plant 100 is provided. The wind power plant 100 is provided with a dynamically-controlled method for controlling the wind power plant and corresponding capabilities to operate a dynamically-controlled method for controlling the wind power plant. The dynamically-controlled method seeks to overcome the loss of reactive current injection during to internal plant equipment consumption as well as to improve the overall voltage profile of the wind power plant.

Figure 5:
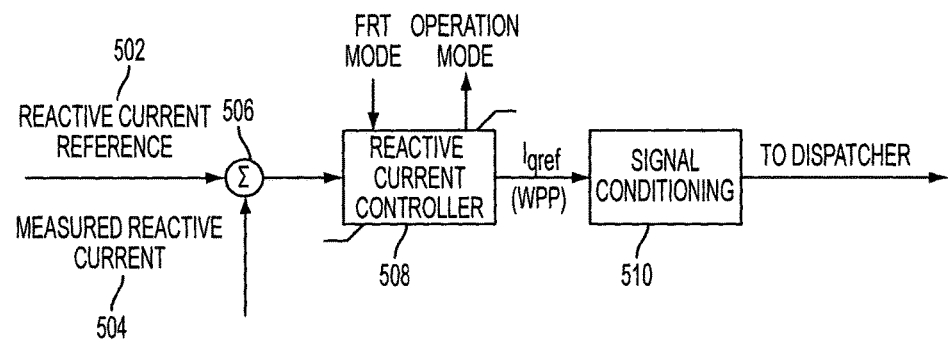
FIG. 5 illustrates a reactive current control scheme according to an embodiment.

FIG. 5 illustrates a reactive current control scheme according to an embodiment. Such a current control scheme allows the PPC 150 to provide for a fault ride through current mode in controlling the wind turbine generators 120. In an embodiment, the current mode is activated when the grid voltage drops below 0.9 p.u., or out of the normal operating band, which also sets on the freeze signal at the PPC 150. When the freeze signal is activated, the PPC 150 ceases the generation and distribution of active and reactive power references P* and Q*. When the freeze signal is received by the wind turbine power controller 124, the last received active and reactive power references P* and Q* from the PPC 150 are also stored for later utilization. At the wind turbine power controller, a fault ride through reactive current injection scheme can be initiated upon receipt of the freeze signal, or through any other predetermined factors, for example, the detection of a drop in grid voltage by a sensor coupled to the wind turbine power controller.

According to an embodiment, the power plant controller 150 includes a plurality of modules provided within the PPC 150, the modules configured to operate a portion of the scheme 500. In an embodiment, the PPC 150 includes a module that operates the scheme 500. In an embodiment, the PPC includes a non-transitory memory on which is provided instructions for carrying out a scheme 500, the PCC further including a processing component configured to read and run the instructions to carry out the scheme 500.

In various embodiments, PPC 150 receives a reactive current reference 502 from a utility operator. In embodiments, the reactive current reference 502 is determined from a reactive current injection requirement provided by a grid code issued by the utility operator. In embodiments, the PPC 150 includes a reactive current reference determination module configured to determine the reactive current injection reference from a reactive current injection requirement provided a grid code, and to output the reactive current reference thereafter.

In various embodiments, PPC 150 includes a reactive current measurement module configured to obtain the reactive current injection output of the wind power plant 100 and to provide a measured reactive current 504. In embodiments, the reactive current measurement module receives an input from a reactive current sensor 256 provided at the PoM which can coincide with the point of common coupling or is slightly downstream therefrom. The input from the reactive current sensor 256 indicates the total amount of reactive current to be provided as injection by the wind power plant. The total amount of reactive current to be provided includes the reactive current generated by the plurality of wind turbine generators in the wind power plant and offset by the amount of reactive current consumed by plant equipment within the wind power plant. In an embodiment, the reactive current measurement module receives an analog input from the reactive current sensor and carries out a signal processing to provide a digital output of measured reactive current.

According to an embodiment, a summation module 506 is provided, the summation module configured to receive a reactive current reference 502 and a measured reactive current 504, and to provide a difference between the reactive current reference 502 and the measured reactive current 504. The output of the summation module 506, the difference between the reactive current reference 502 and the measured reactive current 504, is thereafter provided to a reactive current controller 508.

In an embodiment, reactive current controller 508 can be a part of a control feedback arrangement that determines a difference in a pair of inputs, and seeks to minimize the difference by adjusting various related control inputs. In an embodiment, the control feedback arrangement is an arrangement for a proportional-integral (PI) controller. In an embodiment, the reactive current controller 508 can be a PI controller. In another embodiment, the control feedback arrangement is an arrangement for a proportional-integral-derivative controller.

According to an embodiment, the output of the summation module 506, which is the difference value between the reactive current reference 502 and the measured reactive current 504, is provided to the reactive current controller 508. The reactive current controller 508 will calculate and generate a reactive current reference $I_{qref(WPP)}$ based on the difference value. The reactive current reference $I_{qref(WPP)}$ represents an additional amount of reactive current the wind power plant 100 is to produce in overcoming the deficiency due to internal plant reactive current consumption, and to provide a matching amount of reactive current injection as required by the utility operator in the provided grid codes. This additional amount of reactive current is over and above what the wind turbine generators in the wind power plant will generate according to the grid code provided reactive current injection curve.

Further, the reactive current controller 508 receives a FRT Mode communication signal from a main controller in the PPC 150. The FRT Mode communication signal is provided indicating that the PPC 150 will enter a freeze mode in freezing the active and reactive power reference delivery to the wind turbine generators 120, and for the current injection mode to commence operation. In addition, an Operation Mode communication signal is provided from the reactive current controller 508 to a main controller in the PPC 150 as a status signal to confirm that the current injection control has commenced and that the reactive current reference $I_{qref(WPP)}$ is being generated.

According to an embodiment, the reactive current controller 508 of the PPC 150 provides the generated reactive current reference $I_{qref(WPP)}$ to a signal conditioning module 510. The signal conditioning module 510 carries out a distribution of the reactive current reference $I_{qref(WPP)}$ for the plurality of wind turbine generators 120 in the wind power plant 100, such that each wind turbine generator contributes a reactive current amount which when collated at the PoM matches the reactive current injection requirement of the wind power plant 100.

The wind turbine power controller 124 thereafter receives a reactive current injection reference $I_{qref}$ from the PPC 150, or a dispatcher module provided in the PPC 150. As previously indicated, in a fault ride through situation, the power controller 124 provides a reactive current injection according to a reactive current injection curve. As such, the power controller 124 is configured to provide a reactive current $I_q$ in accordance to the current injection curve.

According to an embodiment, a reactive current injection reference $I_{qref}$ from the PPC 150 is provided to the power controller 124, which requests the wind turbine generator 121 to provide an additional amount of reactive current, over and above the reactive current $I_q$ to be generated according to the current injection curve. According to an embodiment, a power controller 124 is configured to produce an amount of reactive current equivalent to $I_q + I_{qref}$.

To achieve this additional requirement of $I_{qref}$ at a known wind turbine generator voltage, some operating factors are modified, which affect and vary the response of the reactive current injection of the wind turbine generator. According to an embodiment, such factors can be changed in accordance to a look-up table provided and stored in the power controller 124. In an embodiment, the power controller 124 includes a look-up table module, the module configured to store a look-up table for modification of operating factors, and to determine an operational parameter for adjustment with the look-up table.

According to an embodiment, a representative example of a parameter look-up table is provided as follows:

TABLE 1

Parameter look-up table

| Parameter | Adjustment |
|---|---|
| K factor | 2 to 5 |
| K factor | 5 to 10 |
| CC_LIM | 1 pu to 1.1 pu |
| U_LL_LIM | 0.9 pu to 0.95 pu |
| U_LL_LIM | 0.95 pu to 1.0 pu |
| I_offset | 0 to 0.1 pu |
| I_offset | 0 to 0.2 pu |

According to an embodiment, the modifications according to the look-up table Table 1 can be shown with respect to the reactive current injection curve 300 of FIG. 3. In adjusting the above operational parameters according to Table 1, the predetermined reactive current injection curve 300 is modified, which when doing so, improves the reactive current injection capability of the wind turbine generator.

In Table 1, K refers to the slope of current injection from initial provision and can be considered as $I_q/U$. A typical K factor as provided in various grid codes can be 2. In an embodiment, the look-up table directs the power controller to adjust the K-factor from 2 to 5 in one iteration. In an another iteration, the K-factor is adjusted from 5 to 10. The higher the K-factor value, the more reactive current is made available when the grid voltage drops below 0.9 p.u. (where the current injection begins). In FIG. 3, an adjustment to a K factor value of 10 is shown, the slope shown rising up to point P3. This allows a reactive current amount of 1.0 p.u. to be provided when the grid voltage drops to 0.8 p.u.

Table 1, CC_LIM refers to the maximum current which can be provided for a grid low voltage support operation. Typically, the maximum amount of reactive current is set to 1.0 p.u. According to an embodiment, the wind turbine 121 includes a design function which allows for a short time current to be boosted above 1.0 p.u. In an embodiment, CC_LIM is adjusted to 1.1 p.u.

According to an embodiment, in the event of a high voltage grid event, the wind turbine generator is configured to provide a negative reactive current injection. In other words, the wind turbine generator absorbs a reactive current from the grid in providing support for grid recovery. In such a situation, a separate look-up table is provided for a scheme according to an embodiment. The look-up table could include parameters which adjust the reactive current injection power curve. One of the parameters in the look-up table can be IC_LIM, for which refers to the maximum current which can be provided in the grid high voltage support operation. Further, another parameter which can be adjusted to improve a wind turbine generator's capability in the support of a grid high voltage recovery can be U_HL_LIM, which indicates the grid voltage from when reactive current injection can start.

From Table 1, U_LL_LIM refers to the grid voltage from when reactive current generation is initiated. By default, the voltage setting is the same as when the wind turbine generator will enter a low voltage ride through mode. According to an embodiment, U_LL_LIM can be adjusted from 0.9 p.u. to 0.95 p.u. In an embodiment, the U_LL_LIM parameter can be adjusted to 1.0 p.u., i.e. reactive current can be provided once the grid voltage deviates down from the normal operating value of 1.0 p.u. The upward adjustment of U_LL_LIM provides for a more controlled response with respect to grid voltage variation. In FIG. 3, an adjustment of U_LL_LIM is shown, with the lower limit of the grid voltage for which the wind turbine generator initiates reactive current injection set to 1.0 p.u. This provides the wind turbine generator a capability to immediately generate reactive current once the grid voltage drops below 1.0 p.u., and when combined with an adjustment of the K factor value to 10, allows the wind turbine generator to provide an output reactive current of up to 1.0 p.u. when the grid voltage drops to 0.8 p.u.

From Table 1, I_Offset can refer to a current off-set at where the reactive current generation initiates, i.e. at the voltage value set by U_LL_LIM. According to an embodiment, the I_Offset value can be adjusted to 0.1 p.u. In an embodiment, the I_Offset value can be adjusted to 0.2. p.u.

According to an embodiment, the reactive current control scheme 500 is to be carried out iteratively. Once a reactive current reference $I_{qref}$ has been provided to respective wind turbine generators in the plant, such an additional reactive current is generated, over and above what the wind turbine generators have earlier output. The reactive current measurement module thereafter obtains a next measurement of reactive current injection at the PoM, which includes the additional reactive current injection relating to $I_{qref(WPP)}$, as dispatched to the wind turbine generators 120 by the PPC 150. This next measurement is similarly compared at the summation module 506 with the reactive current reference 502.

According to an embodiment, the PPC 150 is configured to run a next iteration of the scheme 500 if there is still a positive difference between the reactive current reference 502 and the measured reactive current 504, i.e. if the reactive current reference 502 is greater than the measured reactive current 504. In the event that the measured reactive current 504 obtained by the reactive current measurement module after corresponding to the wind turbine generators providing an amount of reactive current equivalent to $I_q+I_{qref}$ is still lower than the reactive current reference 502, the loss is taken to be due to reactive current consumption within the plant and a next iteration of the scheme 500 is carried out to further increase reactive current injection by the wind turbine generators. Multiple iterations of the scheme 500 is carried out until the measured reactive current 504, corresponding to the amount of reactive current injection to be provided by the wind power plant 100 is equal to or exceeds the reactive current reference 502 as stipulated by the grid code published by the utility operator.

According to an embodiment, on a following iteration of scheme 500 carried out by the PPC 150 resulting in a reactive current reference $I_{qref}$ delivered to the wind turbine generator, a look-up table module in the power controller 124 is configured to determine a subsequent operational parameter for adjustment, based on the parameter look-up table. As indicated, the parameter look-up table is listed in order of significance, each subsequent entry in the table corresponding to a progressively larger impact on operating parameters in the wind turbine generator, theoretically leading to more reactive current generated.

In an embodiment, in the event that multiple iterations of the scheme 500 lead to an exhaustion of the list of entries in the parameter look-up table, the look-up table module can activate a subsequent look-up table for reference in modifying operational parameters in the operation of the power production module. In an embodiment, the subsequent look-up table is an active current injection capability look-up table, wherein each entry is provided to progressively lower the amount of active current injection capability of a wind turbine generator.

In an embodiment, a representative example of an active current injection look-up table is provided as follows:

TABLE 2

Active current injection look-up table

| Parameter | Adjustment |
|---|---|
| ActiveCurrentLimitZone2U1 | 0.8 → 0.85 |
| ActiveCurrentLimitZone2U2 | 0.8 → 0.4 |
| ActiveCurrentLimitZone2I | 0.4 → 0.2 |
| ActiveCurrentLimitZone3U1 | 0.4 → 0.45 |
| ActiveCurrentLimitZone3U2 | 0.4 → 0.1 |

Reference is made to the active current injection curve 400 in FIG. 4. Parameter "ActiveCurrentLimitZone2U1" is indicated as $Z_2U_1$, parameter
"ActiveCurrentLimitZone2U2" is indicated as $Z_2U_2$, parameter
"ActiveCurrentLimitZone2I" is indicated as $Z_2I$, parameter
"ActiveCurrentLimitZone3U1" is indicated as $Z_3U_1$, parameter
"ActiveCurrentLimitZone3U2" is indicated as $Z_3U_2$, and parameter "ActiveCurrentLimitZone3I" is indicated as $Z_3I$.

It can be noted from the active current injection look-up table that adjustments to the various parameters pertaining to the active current injection curve 400 would allow reduce the amount of active current the wind turbine generator is capable of generating, and at a larger grid voltage value, with respect to a low voltage grid event. Generally, a wind turbine generator is capable of producing current up to 1.44 p.u. The amount of reactive current a wind turbine generator can thus provide is given by $\sqrt{1.44-i_d}$ p.u., where $i_d$ is provided by the modified active current injection curve 400.

According to an embodiment, the PPC 150 iteratively carries out scheme 500. A next measurement of reactive current injection is taken at the PoM after the respective wind turbine generators in the plant have received and reacted accordingly to the provided reactive current reference $I_{qref}$. The PPC 150 carries out a determination if there is still a positive difference between the reactive current reference 502 and the measured reactive current 504, for which it thereby carries out a next iteration of the scheme 500 to further increase reactive current injection by the wind turbine generators. In an embodiment, the look-up table module of the wind turbine power controller is configured to determine a subsequent active current injection parameter for adjustment such that the wind turbine generator is provided with an improved reactive current injection capability.

Figure 6:
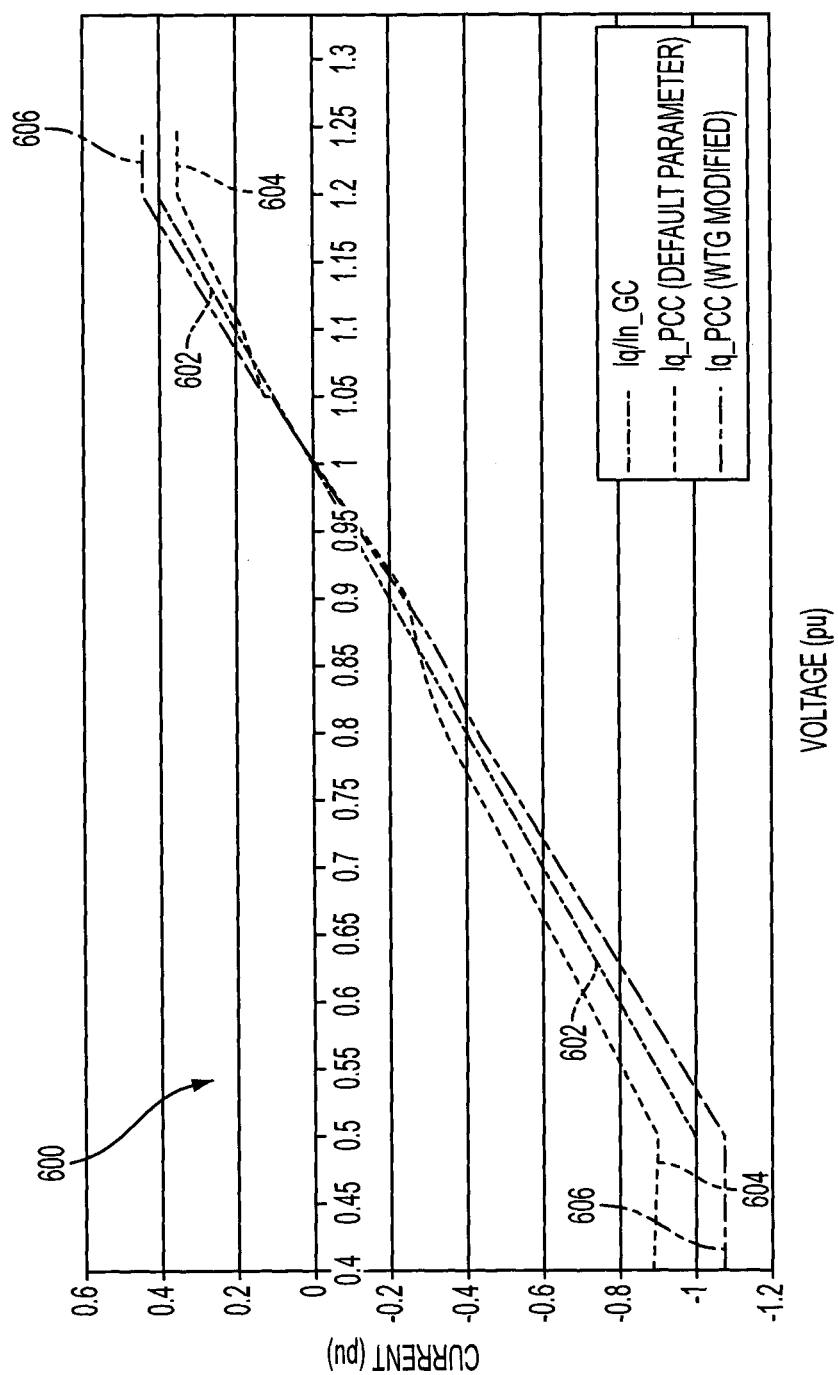
FIG. 6 illustrates a wind power plant reactive current injection according to an embodiment.

FIG. 6 illustrates a wind power plant reactive current injection according to an embodiment. Chart 600 sets out the grid code requirement 602 for a wind power plant connected to the grid, which determines the amount of reactive current the wind power plant is to provide, with respect to grid voltage. 604 shows the amount of reactive current measured at the PoM for the wind power plant operating under normal low voltage ride through reactive current generation and consolidation. It is noted that, for example, when the grid voltage is at 0.5 p.u., the wind power plant is required by the grid code to provide a 1.0 p.u. reactive current injection. However, the wind power plant is only providing a 0.9 p.u. injection, which could be due to internal reactive current consumption by plant equipment. It can be noted that the wind power plant cannot meet grid requirements, and may thereby be subjected to repercussions if it does not modify its production to do so.

606 illustrates the reactive current injection curve according to a wind power plant carrying out a method for controlling a reactive current injection in a wind power plant according to an embodiment of the present disclosure. According to an embodiment, the PPC of a wind power plant determines that there is a difference between the grid requirement of reactive current injection and the actual amount to be provided by the wind power plant, and carries generates a reactive current reference for the generation of additional reactive current by a plurality of wind turbine generators within the wind power plant.

At the wind turbine generators, a look up table module in a wind turbine power controller provides a determination of an operational parameter which affects a predetermined reactive current injection curve, and improves the wind turbine generator reactive current injection capability. According to an embodiment, the method or scheme is iteratively carried out until the grid code requirement is complied with or exceeded.

According to an embodiment, in carrying out the method according to an embodiment, the CC_LIM value of the wind turbine generator is adjusted to 1.1 p.u, the U_LL_LIM is adjusted to 0.95 p.u., and I_Offset is adjusted to 0.1 p.u. The resultant output is charted and provided as curve 606. It can thus be observed that with the implementation of the method according to an embodiment, and the setting of the above-mentioned parameters at the wind turbine generators, a marked improvement can be observed as to the total amount of reactive current provided by the wind power plant to the grid during the grid fault, which satisfies the grid code requirements imposed by the utility operator on the wind power plant.

Figure 7:
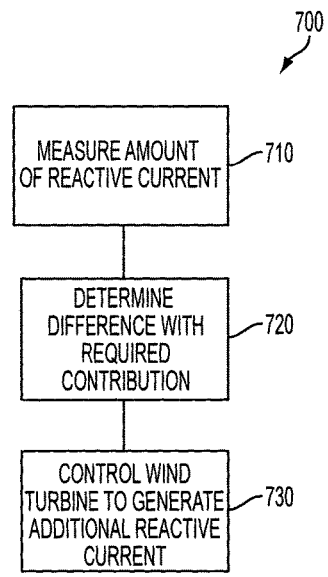
FIG. 7 illustrates a method for controlling a reactive current injection in a wind power plant during a grid fault according to an embodiment.

FIG. 7 illustrates a method 700 of controlling a wind power plant during a grid fault according to an embodiment. In 710, the method includes measuring an amount of reactive current to be provided by the wind power plant to the grid during the grid fault. In 720, the method includes determining a difference between a given required reactive current contribution from the wind power plant and the amount of reactive current to be provided by the wind power plant to the grid during the grid fault. In 730, the method includes controlling a plurality of wind turbine generators in the wind power plant to generate additional reactive current according to a reactive current reference generated based on the difference.

By providing such a method for controlling a reactive current injection in a wind power plant during a grid fault, a dynamic method for handling reactive current injection to support a grid voltage fault event is provided. This provides the wind power plant with a capability of dynamically controlling various operational parameters to increase the reactive current injection capability, such that the consolidated amount of reactive current for injection to the grid meets the predefined requirements as set by a grid utility operator. The need for costly additional compensation equipment to provide additional reactive current capability is thus reduced or eliminated. Further, if changes to the wind power plant layout, for example, the introduction of a new transformer or should a number of wind turbine generator cease to be in operation, creates a deviation from the grid requirements, additional iterations of the provided method can be carried out such as to place the wind power plant back into compliance with the requirements.

In an embodiment, the method further includes carrying out an error-based control loop based on the difference to obtain the reactive current reference.

In an embodiment, the method further includes iteratively carrying out the method in order to reduce the difference between the given required reactive current contribution from the wind power plant and the amount of reactive current to be provided by the wind power plant to the grid during the grid fault.

In an embodiment, the method further includes controlling each wind turbine generator to adjust an operational parameter at the wind turbine generator which improves the reactive current injection capability of the wind turbine generator.

In an embodiment, the operational parameter includes any one of a K factor, a CC limit, an IC limit, a $U_{LL}$ limit, a $U_{HL}$ limit and an $I_{offset}$.

In an embodiment, the method further includes determining the operational parameter for adjustment with a look-up table.

In an embodiment, the method further includes adjusting an active current injection capability of any one of the plurality of wind turbine generators to allow the wind turbine generator to provide a higher reactive current injection capability.

Figure 8:
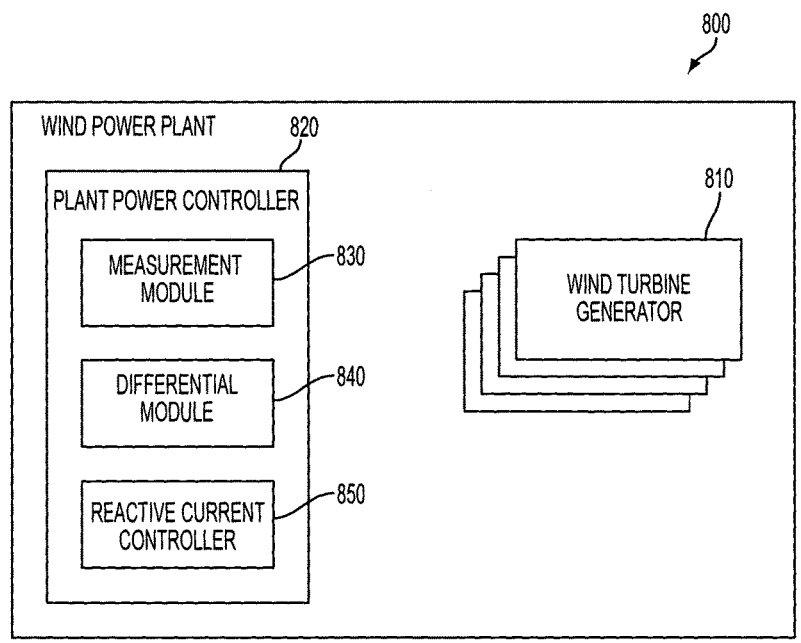
FIG. 8 illustrates a wind power plant according to an embodiment.

FIG. 8 illustrates a wind power plant according to an embodiment. A wind power plant 800 is provided. The wind power plant 800 includes a plurality of wind turbine generators 810. The wind power plant 800 also includes a power plant controller 820. In an embodiment, the power plant controller 820 includes a measurement module 830 configured to measure an amount of reactive current to be provided by the wind power plant to the grid during the grid fault. The power plant controller 820 further includes a differential module 840 configured to determine a difference between a given required reactive current contribution from the wind power plant and the amount of reactive current to be provided by the wind power plant to the grid during the grid fault. In an embodiment, the power plant controller 820 also includes a reactive current controller 850 configured to generate a reactive current reference based on the difference, wherein the power plant controller is arranged to control the plurality of wind turbine generators to generate additional reactive current according to the reactive current reference.

In an embodiment, the differential module and the reactive current controller are part of an error-based control loop to obtain the reactive current reference based on the difference.

In an embodiment, the error-based control loop is a Proportional-Integral controller.

In an embodiment, each of the plurality of wind turbine generators include a wind turbine power controller configured to receive a reactive current reference from the reactive current controller, and adjust an operational parameter which improves the reactive current injection capability of the wind turbine generator.

In an embodiment, the operational parameter includes any one of a K factor, a CC limit, an IC limit, a $U_{LL}$ limit, a $U_{HL}$ limit and an $I_{offset}$.

In an embodiment, the wind turbine power controller further includes a look-up table module configured to determine the operational parameter for adjustment with a look-up table.

In an embodiment, the wind turbine power controller further includes an active current injection module configured to adjust an active current injection capability to allow the wind turbine generator to provide a higher reactive current injection capability.

In an embodiment, the wind turbine power controller is configured to store adjustment settings pertaining to how the wind turbine generator is controlled to generate additional reactive current, and reusing the stored settings in a subsequent grid fault.

According to various embodiments, there is provided at least one computer program product directly loadable into the internal memory of at least one digital computer provided in a wind power plant, including software code portions for performing the steps of a method according to an embodiment of the present disclosure when said at least one product is/are run on said at least one computer.

In various embodiments, a controller for carrying out an operational function in the wind power plant, which includes for example, but not limited to, a plant controller, a power plant controller, a SCADA controller, a wind turbine controller, a wind turbine power controller, or a reactive current controller, includes a digital computer configured to receive a computer program product. In embodiments, digital computers provided in the wind power plant are synchronized and operate cooperatively as part of an overall system.

The above apparatus, method and/or system as described and illustrated in the corresponding figures, is not intended to limit an or any apparatus, method or system as according to an embodiment, and the scope of the present disclosure. The description further includes, either explicitly or implicitly, various features and advantages of the method or system according to the present disclosure, which can be encompassed within an apparatus, method or system according to the disclosure.

While embodiments of the disclosure have been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

What is claimed is:

1. A method for controlling a reactive current injection in a wind power plant during a grid fault, comprising:
    measuring, at a point of measurement between a plurality of wind turbine generators in the wind power plant and a grid, an amount of reactive current provided by the wind power plant to the grid during the grid fault, wherein the amount of reactive current is produced by the wind plant in response to a required reactive current contribution;
    determining a difference between the required reactive current contribution and the amount of reactive current provided by the wind power plant to the grid during the grid fault; and
    controlling the plurality of wind turbine generators in the wind power plant to generate additional reactive current according to a reactive current reference generated based on the difference.

2. The method according to claim 1, further comprising carrying out an error-based control loop based on the difference to obtain the reactive current reference.

3. The method according to claim 1, further comprising iteratively carrying out the method in order to reduce the difference between the given required reactive current contribution from the wind power plant and the amount of reactive current provided by the wind power plant to the grid during the grid fault.

4. The method according to claim 1, comprising controlling each wind turbine generator to adjust an operational parameter at the wind turbine generator which improves a reactive current injection capability of the wind turbine generator.

5. The method according to claim 4, wherein the operational parameter comprises any one of a K factor, a CC limit, an IC limit, a $U_{LL}$ limit, a $U_{HL}$ limit and an $I_{offset}$.

6. The method according to claim 4, comprising determining the operational parameter for adjustment with a look-up table.

7. The method according to claim 1, further comprising adjusting an active current injection capability of any one of the plurality of wind turbine generators to allow the wind turbine generator to provide a higher reactive current injection capability.

8. The method according to claim 1, further comprising storing in each wind turbine generator adjustment settings pertaining to how the wind turbine generator is controlled to generate additional reactive current, and reusing the stored settings in a subsequent grid fault.

9. A wind power plant, comprising:
a plurality of wind turbine generators; and
a power plant controller comprising:
a measurement module configured to measure, at a point of measurement between the plurality of wind turbine generators in the wind power plant and a grid, an amount of reactive current provided by the wind power plant to the grid during a grid fault, wherein the amount of reactive current is produced by the wind plant in response to a required reactive current contribution;
a differential module configured to determine a difference between the required reactive current contribution and the amount of reactive current provided by the wind power plant to the grid during the grid fault; and
a reactive current controller configured to generate a reactive current reference based on the difference, wherein the power plant controller is arranged to control the plurality of wind turbine generators to generate additional reactive current according to the reactive current reference.

10. The wind power plant of claim 9, wherein the differential module and the reactive current controller are part of an error-based control loop to obtain the reactive current reference based on the difference.

11. The wind power plant of claim 10, wherein the error-based control loop is a Proportional-Integral controller.

12. The wind power plant of claim 9, wherein each of the plurality of wind turbine generators comprise a wind turbine power controller configured to receive a reactive current reference from the reactive current controller, and adjust an operational parameter which improves a reactive current injection capability of the wind turbine generator.

13. The wind power plant of claim 12, wherein the operational parameter comprises any one of a K factor, a CC limit, an IC limit, a $U_{LL}$ limit, a $U_{HL}$ limit and an $I_{offset}$.

14. The wind power plant of claim 12, the wind turbine power controller further comprising a look-up table module configured to determine the operational parameter for adjustment with a look-up table.

15. The wind power plant of claim 12, the wind turbine power controller further comprising an active current injection module configured to adjust an active current injection capability to allow the wind turbine generator to provide a higher reactive current injection capability.

16. The wind power plant of claim 12, wherein the wind turbine power controller is configured to store adjustment settings pertaining to how the wind turbine generator is controlled to generate additional reactive current, and reusing the stored settings in a subsequent grid fault.

17. A computer program product directly loadable into an internal non-transitory memory of at least one digital computer provided in a wind power plant, comprising software code portions which, when executed on the at least one computer, perform an operation for controlling a reactive current injection in the wind power plant during a grid fault, the operation comprising:
measuring, at a point of measurement between a plurality of wind turbine generators in the wind power plant and a grid, an amount of reactive current provided by the wind power plant to the grid during the grid fault, wherein the amount of reactive current is produced by the wind plant in response to a required reactive current contribution;
determining a difference between the required reactive current contribution and the amount of reactive current provided by the wind power plant to the grid during the grid fault; and
controlling the plurality of wind turbine generators in the wind power plant to generate additional reactive current according to a reactive current reference generated based on the difference.

\* \* \* \* \*